US012258794B2

(12) United States Patent
Hunt

(10) Patent No.: US 12,258,794 B2
(45) Date of Patent: Mar. 25, 2025

(54) MOTOR VEHICLE LATCH, IN PARTICULAR A MOTOR VEHICLE DOOR LATCH

(71) Applicant: Kiekert AG, Heiligenhaus (DE)

(72) Inventor: Robert J. Hunt, Davisburg, MI (US)

(73) Assignee: Kiekert AG, Heiligenhaus (DE)

( * ) Notice: Subject to any disclaimer, the term of this patent is extended or adjusted under 35 U.S.C. 154(b) by 272 days.

(21) Appl. No.: 17/863,716

(22) Filed: Jul. 13, 2022

(65) Prior Publication Data

US 2024/0018804 A1 Jan. 18, 2024

(51) Int. Cl.

| | |
|---|---|
| ***E05B 81/14*** | (2014.01) |
| ***E05B 79/20*** | (2014.01) |
| ***E05B 81/06*** | (2014.01) |
| ***E05B 81/30*** | (2014.01) |
| ***E05B 81/42*** | (2014.01) |
| ***E05B 85/26*** | (2014.01) |

(52) U.S. Cl.

CPC .............. *E05B 81/14* (2013.01); *E05B 79/20* (2013.01); *E05B 81/06* (2013.01); *E05B 81/30* (2013.01); *E05B 81/42* (2013.01); *E05B 85/26* (2013.01)

(58) Field of Classification Search

CPC .......... E05B 81/14; E05B 81/30; E05B 81/42; E05B 81/06; E05B 81/00; E05B 81/84; E05B 81/90; E05B 79/20; E05B 79/22; E05B 85/26; E05B 17/0029; Y10T 292/1082; Y10T 292/1047; Y10T 292/1056; Y10T 292/1077

USPC .......................................................... 292/201

See application file for complete search history.

(56) References Cited

U.S. PATENT DOCUMENTS 5,474,338 A * 12/1995 Buscher .................. E05B 77/28 292/201
5,634,677 A * 6/1997 Buscher .................. E05B 81/16 292/216

(Continued)

FOREIGN PATENT DOCUMENTS

CA 2439780 C * 9/2011 ............. E05B 81/14
CN 1710233 A * 12/2005 ............. E05B 77/26

(Continued)

OTHER PUBLICATIONS

WO2016103353A1 original and Espacenet machine translation description and claims (Year: 2024).*

*Primary Examiner* — Nicholas L Foster
*Assistant Examiner* — Steven A Tullia
(74) *Attorney, Agent, or Firm* — Renner, Otto, Boisselle & Sklar, LLP

(57) ABSTRACT

A motor vehicle latch, in particular to a motor vehicle door latch, which is equipped with a locking mechanism consisting essentially of a catch and a pawl. Furthermore, a release lever rotatable about an axis of rotation is provided for the locking mechanism. In addition, an electromotive opening drive and a handle connected to a connecting means are provided. In order to open the locking mechanism, the opening drive acts by motor on the release lever, while the handle, including the connecting means, alternatively or additionally acts manually on the release lever. According to the invention, the opening drive acts on the release lever radially on the inside relative to the axis of rotation, and the connecting means acts on said release lever radially on the outside in relation to said axis of rotation.

9 Claims, 1 Drawing Sheet

(56) References Cited

U.S. PATENT DOCUMENTS

| | | | | | |
|---|---|---|---|---|---|
| 5,653,484 | A * | 8/1997 | Brackmann | E05B 77/28 | 292/216 |
| 5,697,236 | A * | 12/1997 | Kleefeldt | E05B 81/14 | 292/201 |
| 5,921,594 | A * | 7/1999 | Bendel | E05B 77/26 | 292/216 |
| 5,961,163 | A * | 10/1999 | Brackmann | E05B 77/28 | 292/216 |
| 6,386,599 | B1 * | 5/2002 | Chevalier | E05B 77/28 | 292/201 |
| 6,428,058 | B1 * | 8/2002 | Graute | E05B 85/01 | 292/201 |
| 6,648,380 | B1 * | 11/2003 | Szablewski | E05B 81/14 | 292/216 |
| 6,679,532 | B2 * | 1/2004 | Inoue | E05B 81/06 | 292/201 |
| 6,715,806 | B2 * | 4/2004 | Arlt | E05B 81/14 | 292/201 |
| 6,764,113 | B1 * | 7/2004 | Cetnar | E05B 77/28 | 292/201 |
| 6,880,866 | B2 * | 4/2005 | Tomaszewski | E05B 77/26 | 292/201 |
| 7,224,259 | B2 * | 5/2007 | Belmond | G07C 9/00309 | 292/201 |
| 7,467,815 | B2 * | 12/2008 | Larsen | E05B 83/16 | 292/216 |
| 7,469,943 | B2 * | 12/2008 | Hiramoto | E05B 81/06 | 292/201 |
| 7,568,740 | B2 * | 8/2009 | Brose | E05B 81/16 | 292/201 |
| 8,061,742 | B2 * | 11/2011 | Machida | E05B 83/40 | 292/201 |
| 8,172,283 | B2 * | 5/2012 | Takahashi | E05B 77/30 | 292/216 |
| 11,619,078 | B2 * | 4/2023 | Rosales | E05B 81/20 | 292/201 |
| 2002/0105192 | A1 * | 8/2002 | Perkins | E05B 81/90 | 292/216 |
| 2004/0094971 | A1 * | 5/2004 | Warmke | E05B 81/06 | 292/201 |
| 2005/0167991 | A1 * | 8/2005 | Yoneyama | E05B 81/20 | 292/201 |
| 2005/0212302 | A1 * | 9/2005 | Fisher | E05B 81/14 | 292/216 |
| 2006/0055181 | A1 * | 3/2006 | Berghahn | E05B 81/20 | 292/216 |
| 2007/0138802 | A1 * | 6/2007 | Stasko | E05B 79/20 | 292/201 |
| 2016/0010364 | A1 * | 1/2016 | Hanaki | E05B 83/40 | 292/201 |
| 2016/0032626 | A1 * | 2/2016 | Margheritti | E05B 81/16 | 292/201 |
| 2020/0248486 | A1 * | 8/2020 | Okuyama | E05B 79/08 | |

FOREIGN PATENT DOCUMENTS

| | | | | | |
|---|---|---|---|---|---|
| DE | 4005641 | A1 * | 8/1990 | E05B 77/28 |
| DE | 19507367 | C1 * | 8/1996 | E05B 77/28 |
| DE | 19928230 | A1 * | 12/2000 | E05B 77/26 |
| DE | 10131965 | A1 * | 6/2002 | E05B 81/06 |
| DE | 202005002481 | U1 * | 7/2006 | E05B 79/20 |
| DE | 102007045227 | A1 * | 2/2008 | E05B 81/06 |
| DE | 102007048452 | A1 * | 11/2008 | E05B 77/32 |
| DE | 102008048772 | A1 | 3/2010 | |
| DE | 102012216976 | A1 * | 4/2014 | E05B 81/06 |
| DE | 102014115323 | A1 * | 6/2015 | E05B 77/26 |
| DE | 202014002995 | U1 * | 8/2015 | E05B 77/36 |
| DE | 102016112260 | A1 * | 1/2018 | E05B 63/143 |
| DE | 102019117557 | A1 | 12/2020 | |
| EP | 1320652 | B1 * | 11/2005 | E05B 77/12 |
| FR | 2775717 | A1 * | 9/1999 | E05B 79/12 |
| GB | 2375139 | A * | 11/2002 | E05B 77/44 |
| GB | 2375140 | A * | 11/2002 | E05B 77/44 |
| WO | WO-9858146 | A1 * | 12/1998 | E05B 81/14 |
| WO | WO-0102677 | A2 * | 1/2001 | E05B 81/14 |
| WO | WO-0120112 | A1 * | 3/2001 | E05B 77/26 |
| WO | WO-2006105772 | A1 * | 10/2006 | E05B 85/01 |
| WO | WO-2013170363 | A1 * | 11/2013 | E05B 77/26 |
| WO | WO-2016103353 | A1 * | 6/2016 | E05B 79/20 |

* cited by examiner

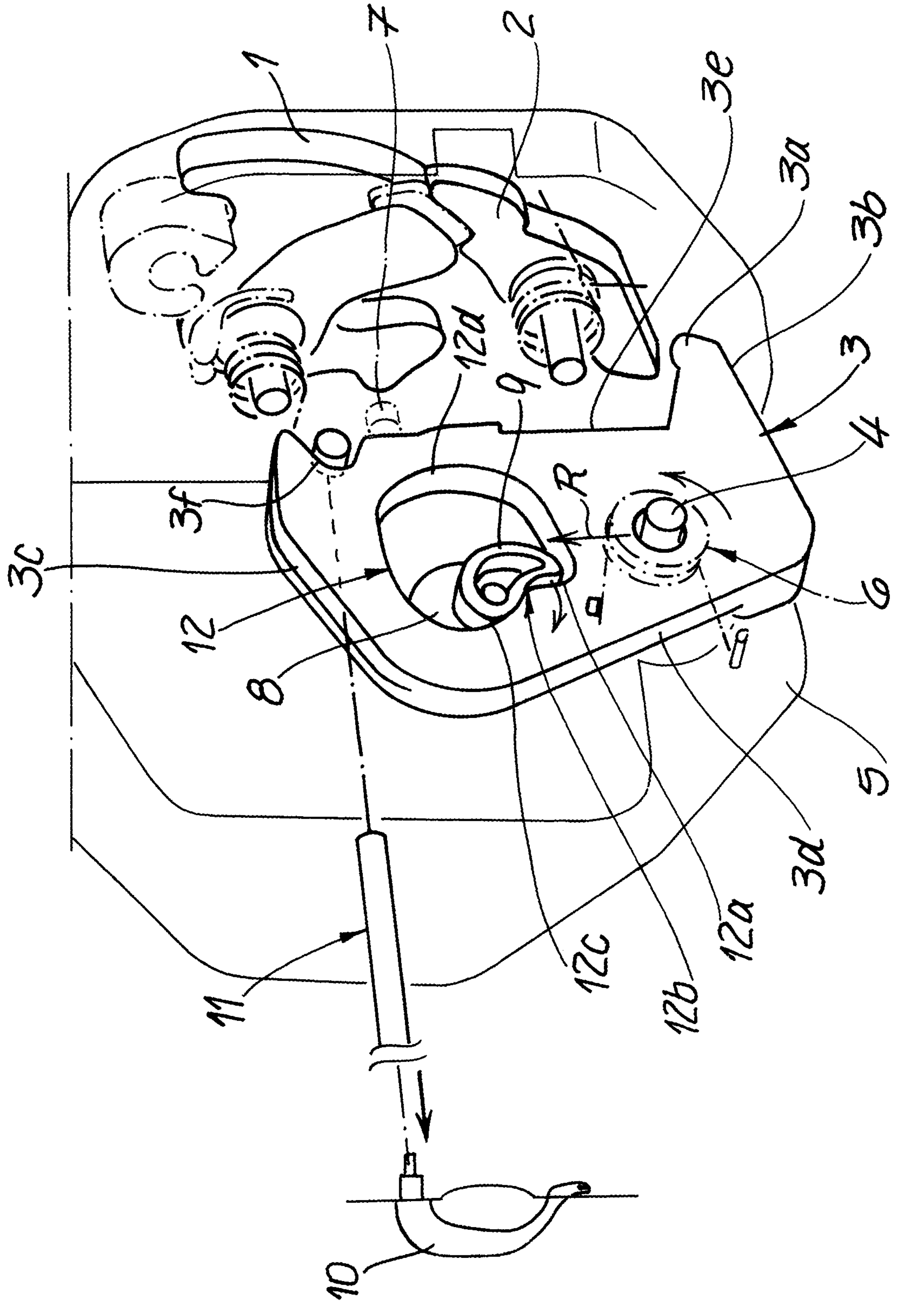
1
7
2
3e
3a
3b
3
4
R
6
5
3d
12a
12b
12c
8
12
3c
3f
12d
9
11
10

MOTOR VEHICLE LATCH, IN PARTICULAR A MOTOR VEHICLE DOOR LATCH

FIELD OF DISCLOSURE

The invention relates to a motor vehicle latch and in particular to a motor vehicle door latch, comprising a locking mechanism consisting essentially of a catch and a pawl, further comprising a release lever for the locking mechanism that is rotatable about an axis of rotation, and comprising an electromotive opening drive and a handle connected to a connecting means, wherein, in order to open the locking mechanism, the opening drive acts by motor on the release lever, and/or the handle, including the connecting means, acts manually on said release lever.

BACKGROUND OF DISCLOSURE

The locking mechanism consisting of a catch and a pawl can in principle be equipped with a first and a second pawl. For example, the generic state of the art according to DE 10 2019 117 557 A1 is used. There, an electromotive opening drive is provided as a component of a release line, which acts on the release lever. In addition, a manual opening process is possible, which is realized, for example, in connection with an emergency operation. DE 10 2008 048 772 A1 takes a similar approach.

In the context with the electromotive opening drive and the manual opening process, the reduction of actuating forces during the opening process is already addressed in the known teaching. However, the previous solutions at this point are not convincing. This is because relatively large actuating forces are required, in particular for the manual opening process, which can also be attributed to the complex structure. The invention as a whole seeks to remedy this.

SUMMARY OF DISCLOSURE

The invention is based on the technical problem of further developing such a motor vehicle latch and in particular a motor vehicle door latch in such a way that a low-cost structure is observed with simultaneously reduced actuating forces for the release lever.

To solve this technical problem, a generic motor vehicle latch and in particular a motor vehicle door latch is characterized within the scope of the invention in that the opening drive engages on the release lever radially on the inside in relation to the axis of rotation, and the connecting means engages on said release lever radially on the outside in relation to said axis of rotation.

In the scope of the invention, the invention is based first of all on the knowledge that a particularly compact and inexpensive structure is provided when both the opening drive and the connecting means and thus the handle can interact directly with the release lever and engage thereon. In principle, of course, an indirect interaction is also possible in such a way that both the opening drive and the handle, including the connecting means, act on the release lever for the actuation thereof via intermediate elements. As a rule, however, the design is such that the opening drive and the connecting means act directly on the release lever and engage on the relevant release lever on the one hand radially on the inside and on the other hand radially on the outside in relation to the axis of rotation of the release lever.

In fact, the handle ensures via the connected connecting means that the release lever can be operated manually in order to open the locking mechanism. This generally corresponds to a pivoting movement of the release lever about its axis of rotation. The pivoting movement of the release lever about its axis of rotation has the effect that, for example, a lug provided on the release lever lifts the pawl or one of the two pawls from its latching engagement with the catch, so that, as a result, the locking mechanism opens with the aid of a spring. A previously caught locking pin is released. The same applies to the corresponding motor vehicle door.

Since the connecting means engages on the release lever radially on the outside in relation to the axis of rotation, a long lever arm is provided for this manual opening process, so that a large torque is finally provided on the output side of the release lever on the lug via the handle, the connected connecting means, and the release lever. This means that only small actuating forces have to act on the handle in order to be able to actuate the release lever so that, via its lug, it lifts the pawl from its latching engagement with the catch. (Low) actuating forces of this kind are provided in the event that the electromotive opening drive has failed. In principle, the manual operation can also take place in the sense of an emergency operation.

In this case, the locking mechanism is typically opened during normal operation with the aid of the electromotive opening drive. However, if the electromotive opening drive fails due to a voltage drop in the electric battery supplying it, due to a crash, etc., for example, a mechanical actuating lever chain previously disengaged during normal operation and belonging to the handle and the connecting means is engaged. As soon as the actuating lever chain is engaged in an emergency actuation or for emergency operation, the locking mechanism can consequently be opened manually via the handle and the connecting means. It is of course also possible within the scope of the invention for the locking mechanism to be opened both with the aid of the opening drive and manually via the handle including the connecting means. In this case, manual opening is consequently also possible and conceivable in normal operation.

Either way, the design according to the invention ensures that a particularly compact and inexpensive structure is observed, because both the opening drive and the connecting means can generally interact directly with the release lever. Simultaneously, a compact structure is observed because intermediate elements can be omitted. Finally, the actuating forces are reduced because the handle having the connected connecting means engages on the release lever radially on the outside in relation to the axis of rotation, and a large torque is thus transmitted to the release lever. In contrast, the electromotive opening drive acts radially on the inside of the release lever, with the electromotive opening drive being equipped with a corresponding design, for example a gear, an actuating cam, etc., to generate sufficient torque.

According to an advantageous embodiment, consequently, the opening drive generally has the actuating cam in question. The actuating cam usually engages in a recess on the release lever. In this way, a particularly compact structure is observed. Because of the actuating cam engaging in the recess, the release lever and the electromotive drive can be arranged overlapping in a front view, so that they are located in different planes. In addition, the release lever can be designed to be particularly expansive, so that a large lever arm is automatically provided for operation of the release lever radially on the outside with the aid of the connecting means, in particular for actuation via the handle and the connecting means.

According to a further advantageous embodiment, the actuating cam generally interacts with a contour in the recess. For this purpose, the contour generally has an actuating contour interacting with the actuating cam. In addition, a further second contour is usually provided in the form of a contact contour for the actuating cam. Both contours are advantageously separated from one another by an elevation.

A rotation of the electromotive opening drive and consequently an opening movement of the actuating cam associated with the electrical opening process result in the actuating cam sliding along the actuating contour inside the recess and correspondingly acting on the actuating contour. As a result, the release lever is pivoted about its axis of rotation in such a way that, with its lug, the release lever can lift the pawl from its latching engagement with the catch. In contrast, the contact contour is typically used to ensure that the actuating cam bears against it in its basic position, and consequently the contact contour functions both as a stop and as a receptacle for the actuating cam.

The contour in question is generally provided on a rear edge of the recess running predominantly in the radial direction compared to the axis of rotation. In addition, the recess usually also has a front stop edge for the actuating cam, which stop edge is typically required for manual operation. If the release lever is thus acted upon manually with the aid of the handle and the connected connecting means, the associated pivoting movement of the release lever about its axis of rotation is limited by the fact that the actuating cam moves against the front stop edge at the end of the actuation path and consequently limits the manual actuation process of the release lever.

The connecting means is generally designed to be flexible. For example and particularly advantageously, this is a Bowden cable. In the simplest case, the Bowden cable is connected to the handle on the one hand and to the release lever on the other. For this purpose, the core of the Bowden cable may be hooked into both the handle and the release lever. In this case, it has proven to be particularly favorable within the scope of the invention if the Bowden cable is hooked into a front-side and head-side recess of the release lever. This simplifies the assembly of the Bowden cable and, simultaneously, the connection of the connecting means to the release lever, observed radially on the outside, is realized and implemented.

As a result, a motor vehicle latch and in particular a motor vehicle door latch is provided which, on the one hand, is particularly compact and, on the other hand, requires low operating forces. This can essentially be traced back to the particularly expansively designed release lever which, when viewed from the front, covers the electromotive opening drive and, consequently, simultaneously ensures a compact structure.

Due to the fact that the electromotive opening drive engages on the release lever radially on the inside in relation to the axis of rotation, and the connecting means engages on said release lever radially on the outside in relation to said axis of rotation, the electromotive opening drive can be subjected to low actuating forces, because the opening drive acts on the actuating cam via an intermediate gear which is possibly present, which actuating cam in turn interacts with the actuating contour in a recess of the release lever. Simultaneously, the manual actuation of the release lever succeeds with particularly little force, because the handle engages radially on the outside in relation to the axis of rotation on the projecting release lever via the connecting means and consequently a high torque is provided at this point. Herein lie the essential advantages.

BRIEF DESCRIPTION OF DRAWINGS

The invention is explained in greater detail below with reference to drawings, which show only one exemplary embodiment. The sole FIG. 1 shows the motor vehicle latch according to the invention in a perspective overview.

DETAILED DESCRIPTION

In the FIGURE, a motor vehicle latch and in particular a motor vehicle door latch is shown. In its basic structure, said latch has a locking mechanism 1, 2 consisting essentially of a catch 1 and a pawl 2. In principle, a plurality of pawls can also be realized at this point, as is the case with the generic state of the art that has previously been referred to. A release lever 3 interacts with the locking mechanism 1, 2 and is mounted in a latch case 5 such that it is rotatable about an axis of rotation 4.

In fact, the latch case 5 is made of plastics material. The same may apply to a pivot pin 4 defining the axis of rotation 4 of the release lever 3. The release lever 3 is also typically made of plastics material and is an injection-molded part made of plastics material. It can be seen that the release lever 3 according to the exemplary embodiment has a lug 3*a* and is designed overall in the manner of a trapezoid, comprising a lower edge 3*b*, an upper edge 3*c*, and two side edges 3*d*, 3*e* running obliquely. It can be seen that the two side edges 3*d*, 3*e* run approximately radially in comparison to the axis of rotation 4.

The axis of rotation 4 is assigned a spring 6 which encompasses the pivot pin 4 realized at this point in the manner of a spiral spring and overall ensures that the release lever 3 assumes its basic position shown in FIG. 1 in contact with a stop 7. Any pivoting movements of the release lever 3 about its axis of rotation 4 in the counterclockwise direction indicated in FIG. 1 result in the lug 3*a* driving against the pawl 2 and pivoting it. As a result, the latching of the (closed) locking mechanism 1, 2 is lifted and the catch 1 can swing open with the aid of a spring and release a locking pin (not expressly shown) that was previously caught. The associated motor vehicle door can be opened.

An electromotive opening drive 8, 9 is also part of the further basic structure of the motor vehicle latch. From the electromotive opening drive 8, 9, a driven pulley 8, which is driven and rotated by an electric motor (not shown in detail), can be recognized. An actuating cam 9 is coupled to the driven pulley 8 in a rotatably fixed manner, which performs clockwise pivoting movements about its axis, indicated in FIG. 1, in order to thereby pivot the release lever 3 counterclockwise about its axis of rotation 4, so that the locking mechanism 1, 2 can be opened.

In addition to the above-mentioned electromotive opening drive 8, 9, a manual opening of the locking mechanism 1, 2 is then alternatively or additionally possible. For this purpose, the motor vehicle latch shown, and in particular the motor vehicle door latch, has a handle 10 and a connecting means 11 connected to the handle 10. According to the exemplary embodiment, the connecting means 11 is designed to be flexible. In fact, it is a Bowden cable 11, which, with its core, is hooked on the one hand into a recess 3*f* of the release lever 3 and on the other hand into a recess of the handle 10 (not expressly shown). The recess 3*f* is provided on the front side and on the head side of the release lever 3. As soon as the handle 10 in the exemplary embodiment according to FIG. 1 is subjected to a pull indicated there (to the left), this again has the effect that the release lever 3 is pivoted counterclockwise about its axis of rotation 4, so that the release lever 3 with its lug 3*a* can open the locking mechanism 1, 2 as described above.

In order to open the locking mechanism 1, 2, the electromotive opening drive 8, 9 and the handle 10 connected to the connecting means 11 can now act by motor and/or manually on the release lever 3. This can be done simultaneously or alternatively. A manual actuation of the release lever 3 is also conceivable and possible within the scope of the exemplary embodiment within the scope of an emergency operation, as has already been described in the introduction.

Based on the example shown in FIG. 1, it can be seen that the release lever 3 according to the exemplary embodiment is constructed in a particularly expansive manner. As a result, the electromotive opening drive 8, 9 can engage on the release lever 3 radially on the inside, whereas the connecting means 11 engages on the release lever 3 radially on the outside, in each case in relation to the axis of rotation 4. As a result of this, the handle 10 or the connecting means 11 acted upon by the handle 10 acts on the release lever 3 with a relatively large lever arm in relation to the axis of rotation 4, so that low actuating forces are required on the handle 10 in order to be able to manually act on the release lever 3 to open the locking mechanism 1, 2.

As already explained, the electromotive opening drive 8, 9 has the actuating cam 9. The actuating cam 9 engages in a recess 12 of the release lever 3. In fact, the actuating cam 9 interacts with a two-part contour 12*c*, 12*b* in the recess 12. The contour 12*c* is an actuating contour which interacts with the actuating cam 9. In addition, a contact contour 12*b* for the actuating cam 9 is provided. Contour 12*a* assures a clearance is maintained to cam 9 in the idle state over all build variations.

The contour 12*c*, 12*b* is provided on a rear edge of the recess 12 running predominantly in the radial direction R compared to the axis of rotation 4. In this context, a front edge 12*d* of the recess 12 functions as a clearance for manual travel of lever 3. This front clearance edge 12*d* inside the recess 12 ensures that, in the case of a manual actuation of the release lever 3 with the aid of the handle 10, the associated actuating movement of the release lever 3 about its axis 4 can be achieved regardless of the position of actuating cam 9. Thus a manual release is assured despite any failure of the electromotive opening drive.

The mode of operation is as follows. Starting from the basic position in FIG. 1, the locking mechanism 1, 2 can in principle be opened by the release lever 3 being acted upon about its axis of rotation 4 in the counterclockwise direction indicated there. This takes place against the force of the spring 6. As a result, the lug 3*a* of the release lever 3 moves upward against the pawl 2 and lifts it from its latching engagement with the catch 1. The catch 1 can then swing open with the aid of a spring (not shown) and/or door rubber sealing forces and releases a previously caught locking pin (not shown). As a result, the associated motor vehicle door can be opened.

The opening movement of the release lever 3 can be brought about on the one hand by the electromotive opening drive 8, 9 and on the other hand by a manual actuation of the handle 10. In the case of an electromotive opening of the release lever 3, this results in a counterclockwise movement of the actuating cam 9.

During this counterclockwise movement of the actuating cam 9, the end thereof ensures that the actuating cam 9 moves against the actuating contour 12*c* and thereby pivots the release lever 3 counterclockwise about the axis of rotation 4 as desired. Contour 12*b* provides additional lift and speed to the release lever 3 near the end of travel. This additional travel and speed provides a comfortable clearance between the pawl 2 and catch 1 where less effort is required to rotate the pawl 2. In contrast, in the idle state, contour 12*a* provides a comfortable clearance to the full travel end of actuating cam 9 as it rests against the contact contour 12*b*. Contour 12*b* provides an elevation between contours 12*a*, 12*c*. Additionally contours 12*c*, 12*b* provide different rates of operation of lever 3.

If, on the other hand, the release lever 3 is acted upon manually, this results in a tensile force engaging on the connecting means or Bowden cable 11 and indicated in FIG. 1 (in the exemplary embodiment in the direction of the arrow to the left). The result of this is that the release lever 3 is again pivoted counterclockwise about its axis of rotation 4. This pivoting movement is not limited by any position of the actuating cam 9 due to the front clearance edge 12*d*.

LIST OF REFERENCE SIGNS

Catch 1
Pawl 2
Locking mechanism 1, 2
Upper edge 2
Release lever 3
Lug 3*a*
Lower edge 3*b*
Upper edge 3*c*
Side edges 3*d*, 3*e*
Recess 3*f*
Axis of rotation 4
Pivot pin 4
Latch case 5
Spring 6
Stop 7
Driven pulley 8
Actuating cam 9
Opening drive 8, 9
Handle 10
Connecting means 11
Recess 12
Contours 12*a*, 12*c*
Elevation 12*b*
Edge 12*d*
Radial direction R

The invention claimed is:

1. A motor vehicle latch comprising:

a locking mechanism having a catch and a pawl, a release lever which is rotatable about an axis of rotation and that is engageable with the pawl to open the locking mechanism, an electromotive opening drive that includes a motor, and a handle connected to a flexible connecting means, wherein:

the locking mechanism is opened by either of the electromotive opening drive acting by the motor on the release lever, or the handle including the connecting means acting manually on the release lever, the electromotive opening drive engages on the release lever radially on an inside in relation to the axis of rotation of the release lever, and the connecting means engages on the release lever radially on an outside in relation to the axis of rotation of the release lever, wherein the electromotive opening drive engages on the release lever a first distance from the axis of rotation of the release lever, and the connecting means engages on the release lever a second distance from the axis of rotation, wherein the second distance is larger than the first distance, the electromotive opening drive has an actuating cam, the actuating cam engages a recess on the release lever, the actuating cam interacts with a contour of the recess, the recess has a front clearance edge spaced from the contour such that the connecting means manually rotates the release lever independent of the actuation cam interacting with the contour, and the contour is provided on a first edge of the recess and the front clearance edge is provided on a second edge of the recess that is opposite the first edge such that when the connecting means acts manually on the release lever the front clearance edge moves toward the actuating cam until the front clearance edge engages the actuating cam limiting manual action of the release lever.

2. The motor vehicle latch according to claim 1, wherein the contour has an actuating contour interacting with the actuating cam and a contact contour that functions as a stop and a receptable for the actuating cam.

3. The motor vehicle latch according to claim 2, wherein the actuating contour and the contact contour provide different rates of operation of the release lever.

4. The motor vehicle latch according to claim 2, wherein the actuating contour and the contact contour are separated from one another by an elevation.

5. The motor vehicle latch according to claim 1, wherein the contour is provided on a rear edge of the recess running in a radial direction relative to the axis of rotation.

6. The motor vehicle latch according to claim 1, wherein the connecting means is a Bowden cable.

7. The motor vehicle latch according to claim 6, wherein the Bowden cable is hooked into a front-side and head-side recess of the release lever.

8. The motor vehicle latch according to claim 1, wherein the electromotive opening drive and the release lever are in different planes and overlap each other.

9. The motor vehicle latch according to claim 1, further comprising a spring that biases the release lever in an initial position against a stop, and the release lever rotates from the initial position to open the locking mechanism.

* * * * *